United States Patent
Mehrkens (10) Patent No.: US 9,861,026 B2
(45) Date of Patent: Jan. 9, 2018

(54) SEED TREATER

(71) Applicant: Bayer CropScience LP, Research Triangle Park, NC (US)

(72) Inventor: Kurt Mehrkens, Zumbrota, MN (US)

(73) Assignee: Bayer CropScience, LP, Research Triangle Park, NC (US)

(*) Notice: Subject to any disclaimer, the term of this patent is extended or adjusted under 35 U.S.C. 154(b) by 238 days.

(21) Appl. No.: 14/965,593

(22) Filed: Dec. 10, 2015

(65) Prior Publication Data

US 2016/0198622 A1    Jul. 14, 2016

Related U.S. Application Data

(60) Provisional application No. 62/089,934, filed on Dec. 10, 2014.

(51) Int. Cl.
*A01C 1/06* (2006.01)
*A01C 1/00* (2006.01)

(52) U.S. Cl.
CPC ..................... *A01C 1/00* (2013.01)

(58) Field of Classification Search
CPC .......... A01K 1/126; A01K 1/12; A01K 1/123; A01J 5/044
See application file for complete search history.

(56) References Cited

U.S. PATENT DOCUMENTS

| | | | | |
|---|---|---|---|---|
| 5,531,826 | A * | 7/1996 | Fusejima | A23G 3/26 118/19 |
| 5,582,643 | A * | 12/1996 | Takei | A23P 20/18 118/19 |
| 5,589,246 | A | 12/1996 | Calhoun et al. | |
| 6,582,516 | B1 * | 6/2003 | Carlson | A01C 1/06 118/13 |
| 7,686,238 | B2 * | 3/2010 | Naito | B01J 2/18 241/1 |
| 9,675,001 | B2 * | 6/2017 | Meyer | A01C 1/00 |
| 2006/0236925 | A1 * | 10/2006 | Lund | A01C 1/00 118/19 |
| 2007/0228201 | A1 * | 10/2007 | Naito | B01J 2/18 241/107 |
| 2013/0273236 | A1 * | 10/2013 | Reineccius | A01C 1/06 427/4 |

* cited by examiner

*Primary Examiner* — Kristen C Hayes

(57) ABSTRACT

A seed treater comprises a rotatable bowl positioned in a bowl containment, the containment closeable with the rotatable bowl therein and having ports or inlet for seed and seed treatment chemicals, the containment having a containment base and a cover. The containment base having a generally cylindrical wall portion, a bottom wall portion below the bowl, and a corner wall portion connecting the cylindrical wall portion and the bottom wall portion. The containment base having access ports for cleaning and the corner wall portion is a curved wall portion having a radius of curvature of at least one inch with no sharp interior corners between the planar bottom wall portion and the cylindrical wall portion. A liner, such as a polymer liner, may be installed on the cylindrical wall such that it is adjacent the upper edge of the bowl and extending upwardly on the cylindrical wall. Whereby a batch seed treater is provided with enhanced cleaning and maintenance capabilities.

14 Claims, 8 Drawing Sheets

SEED TREATER

BACKGROUND OF THE INVENTION

Various kinds of seed treaters are known for applying chemicals such as pesticides and herbicides to seeds prior to planting. In that such chemicals may be extremely expensive, seed treaters need to efficiently and uniformly apply the chemicals to the seeds with minimal waste.

Always in grain and seed handing, including seed treating, cleanliness and minimization of debris is important. Accumulation of debris can lead to pest issues and even fire/explosion hazards or contamination issues. Seed treater containment is conventionally formed by cutting, forming, welding, and otherwise assembling the containment base from multiple parts. Seed treaters that are formed from multiple components necessarily have crevices and junctures and corners that can collect debris. Additionally, welded junctures may have weld defects and/or be subject to failure.

Commercial seed treaters must be able to handle different types of seeds and varying chemical treatments, both in application rates and selection. Treaters are commonly called batch treaters and continuous flow seed treaters. In continuous flow treaters, the seeds are dispensed in a cylindrical curtain of falling seeds and a horizontally sprayed shower of liquid chemical intersects the curtain of falling seeds. The seed then typically falls and is guided into a cylindrical mixing drum to uniformly coat the seeds. The continuous flow seed treaters typically have no close tolerances gaps between high speed moving components and stationary containment components. Moreover, continuous flow seed treaters generally do not have the type of gaps and crevices that the seed, seed debris, and chemicals can fall though out of the seed treatment flow path to accumulate.

On the other hand, batch treaters treat a fixed amount of seed at one time, typically in a high speed rotatable bowl arrangement. Such seed treaters have a stationary containment securing a rotatable bowl therein with a small gap (for example 0.025 in.±0.010 in.) between a peripheral upper edge of the bowl and the containment. The containment comprises a containment base and a cover. The containment base has a cylindrical side wall that conforms to the peripheral upper edge of the bowl, a floor portion, and an open top; a cover covers the open top. Such batch seed treater must be carefully manufactured to exacting tolerances, particularly the rotatable bowl and containment such that the gap is sufficient to preclude contact between the rotatable bowl and the containment wall while minimizing seeds, seed debris, and chemicals from falling through the gap into the interior of the containment below the spinning bowl. Inevitably, this region will receive and accumulate debris from the treating process. Such debris requires periodic removal and cleaning. The containment with bowl may be disassembled for cleaning. Alternately, relatively small removable access doors allow cleaning without disassembly. The seams, cracks, and interior corners of conventional bowl containments can make such cleaning difficult allowing accumulation of debris. Keeping the size of the gap between the containment and the spinning bowl reduces the amount of seeds, treatment chemicals, and other debris that fall below the bowl. Particularly for larger batch seed treaters, such as for containments 30 inches in diameter or greater, manufacture of such batch treaters is tedious, difficult, and expensive, and typically each containment base is manufactured individually to match a specific bowl.

Cost effective improvements in manufacturing and performance and minimization of junctures and welded joints and difficult to clean corners in seed treaters would be welcome.

SUMMARY OF THE INVENTION

A seed treater comprises a rotatable bowl positioned in a bowl containment, the containment closeable with the rotatable bowl therein and having ports for seed and seed treatment chemicals, the containment having a containment base and a cover.

The rotatable bowl having a conical portion and a central unitary hub portion for connection to a hub assembly and shaft. The hub portion connected to a drive system for rotatable the bowl about a vertical axis of rotation. The containment base having a generally cylindrical wall portion positioned laterally of the bowl, a planar bottom wall portion below the bowl, and a corner wall portion connecting the cylindrical wall portion and the bottom wall portion. The containment base having access ports for cleaning and the corner wall portion is a curved wall portion having a radius of curvature of at least ¾ inch. In embodiments, the corner wall portion having a radius of curvature of at least 2.5 times the thickness of the generally cylindrical steel wall portion. In embodiments, the curved wall portion does not have any sharp interior corners between the planar bottom portion and the cylindrical wall portion. In embodiments of the invention the interior corners at the corner portion are greater than 90 degrees. In embodiments the inside corners of the corner wall portion are greater than 110 degrees. The containment and bowl are typically formed of steel. A liner, such as a polymer liner, may be installed on the cylindrical wall such that it is adjacent the upper edge of the bowl and extending upwardly and downwardly on the cylindrical wall with respect to the upper edge of the bowl. The liner receiving seed impact during the seed treating process, and the liner being replaceable when worn or damaged. The cover having a cylindrical wall portion, a planar top wall portion, and a corner portion joining the planar top wall portion to the cylindrical wall portion. The cylindrical wall portion of the cover coaxial with the cylindrical wall portion of the base, and in embodiments, configured to have a lesser radius whereby the inside surface of the liner is flush with the inside surface of the cylindrical wall portion of the cover. The above features providing an enhanced batch seed treater with enhanced cleaning and maintenance capabilities. In embodiments, the containment is about 30 inches in diameter or greater.

A feature and advantage of embodiments of the invention is that such corner wall portion does not tend to collect debris and chemicals and the corner wall portion is more readily cleaned compared to conventional 90 degree inside corner wall portions.

A feature and advantage of embodiments of the invention, other than at ports and a top connecting flange, the cylindrical wall is seamless thereby reducing welded junctures that could fail and accumulate debris or chemicals.

In embodiments, the cylindrical wall portion is joined to the bottom wall portion by way of a unitary deformed curved corner wall portion and being seamless thereby minimizing corners and cracks where debris and treatment chemicals can accumulate. The side walls are a unitary deformed cylindrical shaped wall, unitary with the curved corner and the bottom wall portion. Ports are provided in the cover for feeding seeds and chemicals.

In embodiments, the base may be formed of a planar metal plate deformed by the manufacturing technique known as spinning. The containment base of the containment has a cylindrical wall and floor portion with the cylindrical wall formed by spinning. The cylindrical wall is carefully sized to minimize the gap between an upper edge of the spinning bowl and the adjacent cylindrical wall. A liner, such as a metal or polymer liner, may be installed on the cylindrical wall such that it is adjacent the upper edge of the bowl and extending upwardly on the cylindrical wall. Whereby the seed engages the liner as part of the tumbling/mixing action during seed treatment and whereby the liner may be readily replaced when worn or damaged.

The bowl may have seed engagement strips on the interior surface that assist in forcing the seed to spin along with the rotatable bowl. The bowl has an inverted frustoconical shape with an inside surface facing upwardly such that as the bowl is rotated and the seed is spun, centrifugal force urges the seed upwardly along the inside surface of the bowl to and past the upper edge of the bowl. An upper portion of the cylindrical wall and/or the cover may have fixed vanes that direct the spinning and upwardly rising seeds radially inward such that they are deflected and directed inwardly where they fall downwardly toward the middle of the rotatable bowl and are thus captured in a rotating and rolling mixing pattern. The chemicals are typically in liquid form and are sprayed into the rotating and rolling mixing pattern. Dry chemicals may also be added. The liquid chemicals are typically applied to a rotatable disk that is spinning in a direction opposite that of the rotatable bowl and that is positioned centrally within the bowl. A treated seed outlet port with a door is provided on a portion of the cylindrical wall or cover above the upper edge of the spinning bowl. The door is openable to allow discharge of the seed from the containment into the outlet port as the seed is moving circumferentially and rising upwardly.

In embodiments of the invention, seed treater bowl containment base are repeatedly and uniformly formed by spinning and deforming a metal plate around a spinning containment form. The cylindrical wall portion, the planar wall portion, and the corner wall portion are formed from a single planar steel plate. After shaping the base portion, access ports and holes, may be conventionally cut such as be lasers. In embodiments the cover may also be formed by spinning a planar plate.

An advantage and feature of embodiments of the invention, where the containment base and/or the cover is formed by spinning, is that labor time and final costs may be considerably reduced. A further feature is that bowls and containment bases do not need to be individually matched and sized for each other. Better tolerances provided by the spinning of the containment base allow containment bases and bowls to be mixed and matched while maintaining a 0.025±0.010 in. gap therebetween.

A feature and advantage of embodiments of the invention is that better performing containments may be manufactured in less time, with less labor, and with less cost.

DETAILED DESCRIPTION

Referring to FIGS. 1-4, a batch seed treater 20 generally comprises a rotatable bowl 24 inside a containment 26 with a seed inlet 28, a hopper 29, a chemical treatment inlet tube 30, a spinning spray member 32 configured as a circular plate, a discharge chute 34, a support frame 35 including a support base 36, drive shaft 38 for the rotatable bowl 40, bowl hub 42, a drive shaft 46 for the spinning spray member. The containment 26 generally comprises a containment base 50 with a containment base flange 54, a cover 52 with a cover flange 56, and latches 62. Motors and drive systems (not shown) for driving the rotatable bowl shaft 38 and spinning spray member drive shaft 46 are located in the support base 36. See, in particular, FIGS. 1, 2A and 4. A control panel 48 with operator interface may be mounted to the support frame 35 as part of the batch seed treater. The cover 52 removably attaches to the containment base 50 with the cover flange 56 confronting the containment base flange 54, may utilize a seal ring 57, FIG. 2C, and is secured by latches 62.

Referring to FIGS. 2A, 2B, 4, 7, and 8, the rotatable bowl 24 may be configured as illustrated and has a conical portion 70, a planar inner portion 72, and an uppermost peripheral edge 76. Circular support gussets 80 that may be welded on the outside surface 82 of the conical portion for rigidity and shape control, particularly during rotation. Suitable opening 83 are put in the planar inner portion 72 for connection to the bowl hub assembly 42 by fasteners, for example.

The cover may be conventionally formed from steel. Baffles 82 direct the seed inwardly where it falls to again be lifted. The continual seed cycling during the treatment process is conventional.

Referring to FIGS. 2A-6 and 9, the containment base 50 comprises a cylindrical wall portion 90, a bottom wall portion 92, and a corner wall portion 94 that connects the bottom wall portion 92 and cylindrical wall portion. Access ports 96, configured as rectangular openings, are disposed in the cylindrical side wall portions. Removable panels 98 attach with fasteners or the like to allow access into the open region 100 below the rotatable bowl. A replaceable liners 105 may be formed of polymers or metals, such as stainless steel, and secured with conventional fasteners. The liner is positioned directly at the upper peripheral edge of the bowl on the cylindrical steel wall and extends downwardly and upwardly therefrom. The liner can absorb the wear caused by the recirculating seed impacting the cylindrical wall and after a particular amount of wear, may be replaced. The liner may be formed in two arcuate portions 106, each formed to be semi-cylindrical and fastened in place with conventional fasteners. The inside surface 108 of the liner 107 is preferably in alignment, flush, with the inside surface 109 of the cylindrical wall portion 90 of the containment base as best shown in FIG. 2C. A window 112 in one of the arcuate portions of the liner accommodates the discharge port 110 as best shown in FIG. 2B.

The discharge chute 34 attached at the discharge port 110 includes a discharge gate assembly 111 that controls discharge of the seed after treatment.

Figure 1:
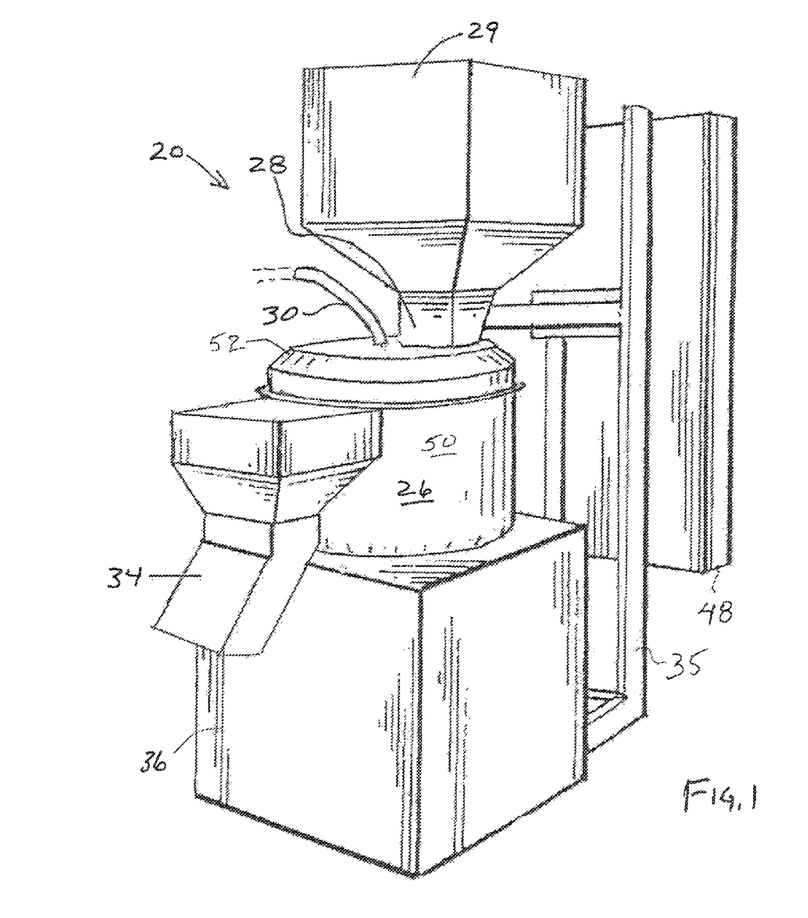
FIG. 1 is a batch seed treater apparatus according to embodiments of the invention.
Figures 2A, 5, 6, 11:
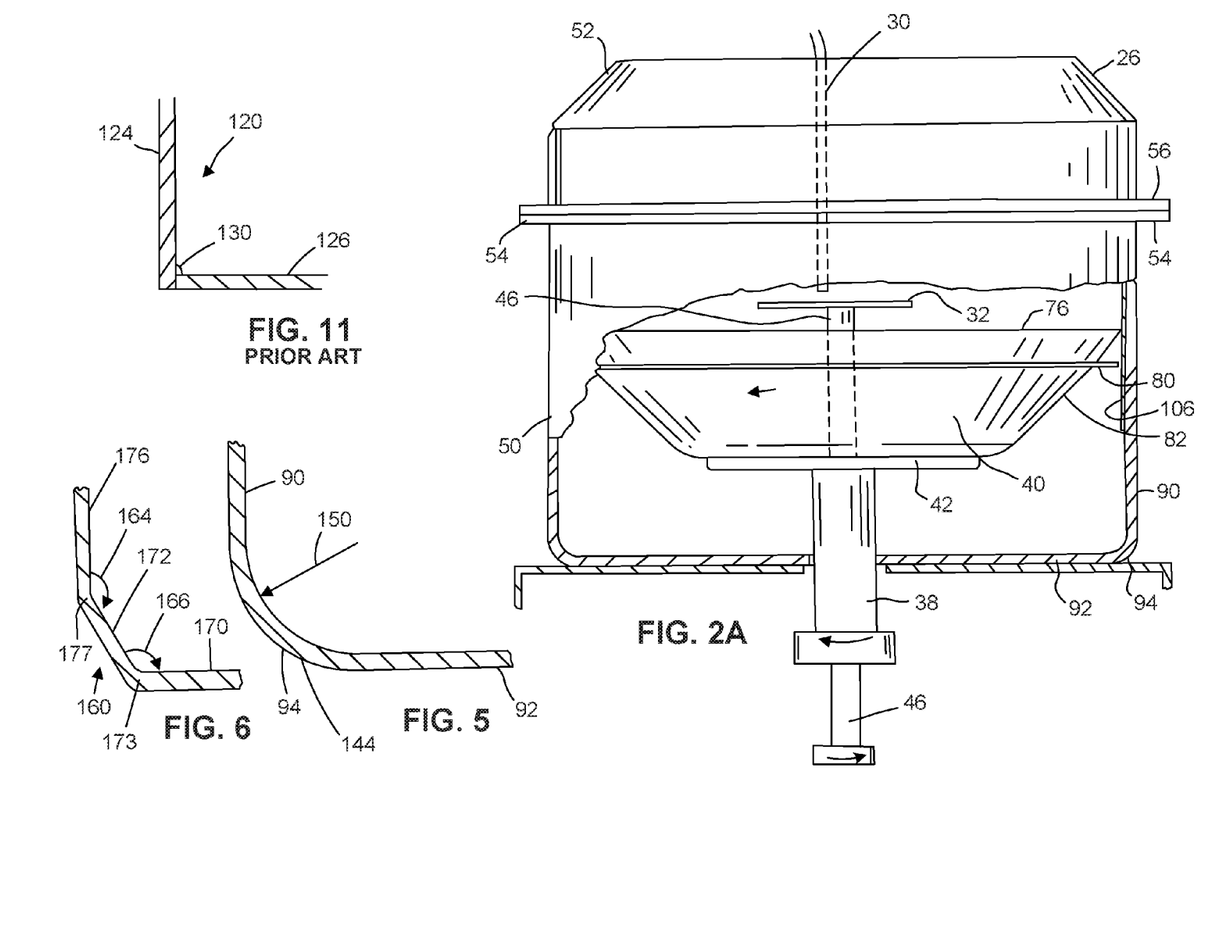
FIG. 2A is an elevational view with a partial cross-section showing the corner wall portions curved and the rotatable bowl and the liner.
FIG. 5 is a cross sectional view showing a curved corner with an inside radius of curvature according to embodiments of the invention.
FIG. 6 is a cross sectional view showing a corner wall portion with a pair of inside corner angles each with an angle greater than 110 degrees according to embodiments of the invention.
FIG. 11 is a cross sectional view of a prior art corner wall portion of a containment.
Figure 2B:
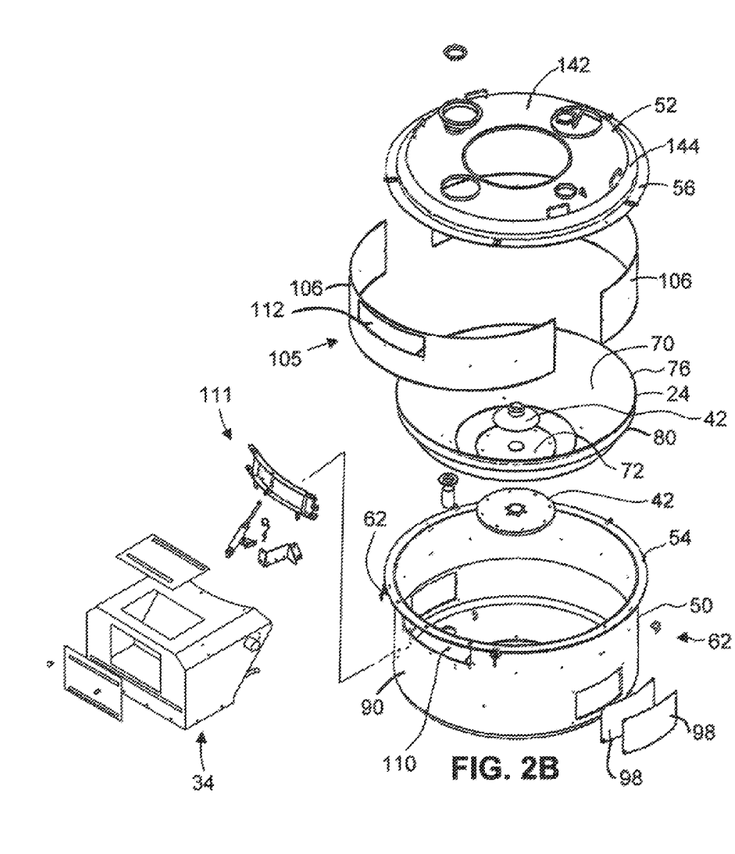
FIG. 2B is an exploded perspective view of components of the seed treater.
Figure 2C:
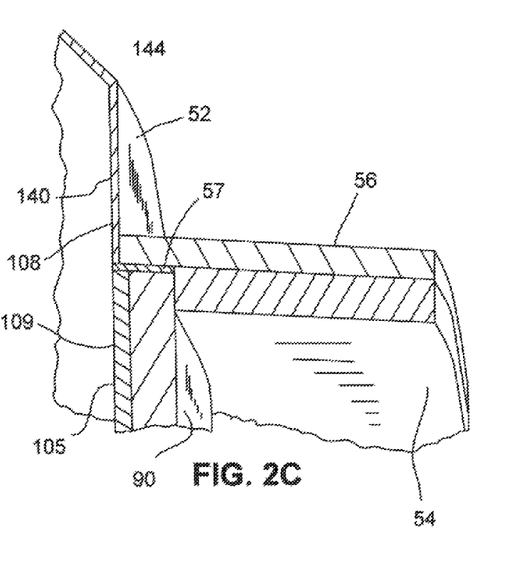
FIG. 2C is a cross sectional view of the connection between the cover and containment base with a liner of a seed treater in accord with the inventions herein.
Figures 3, 7:
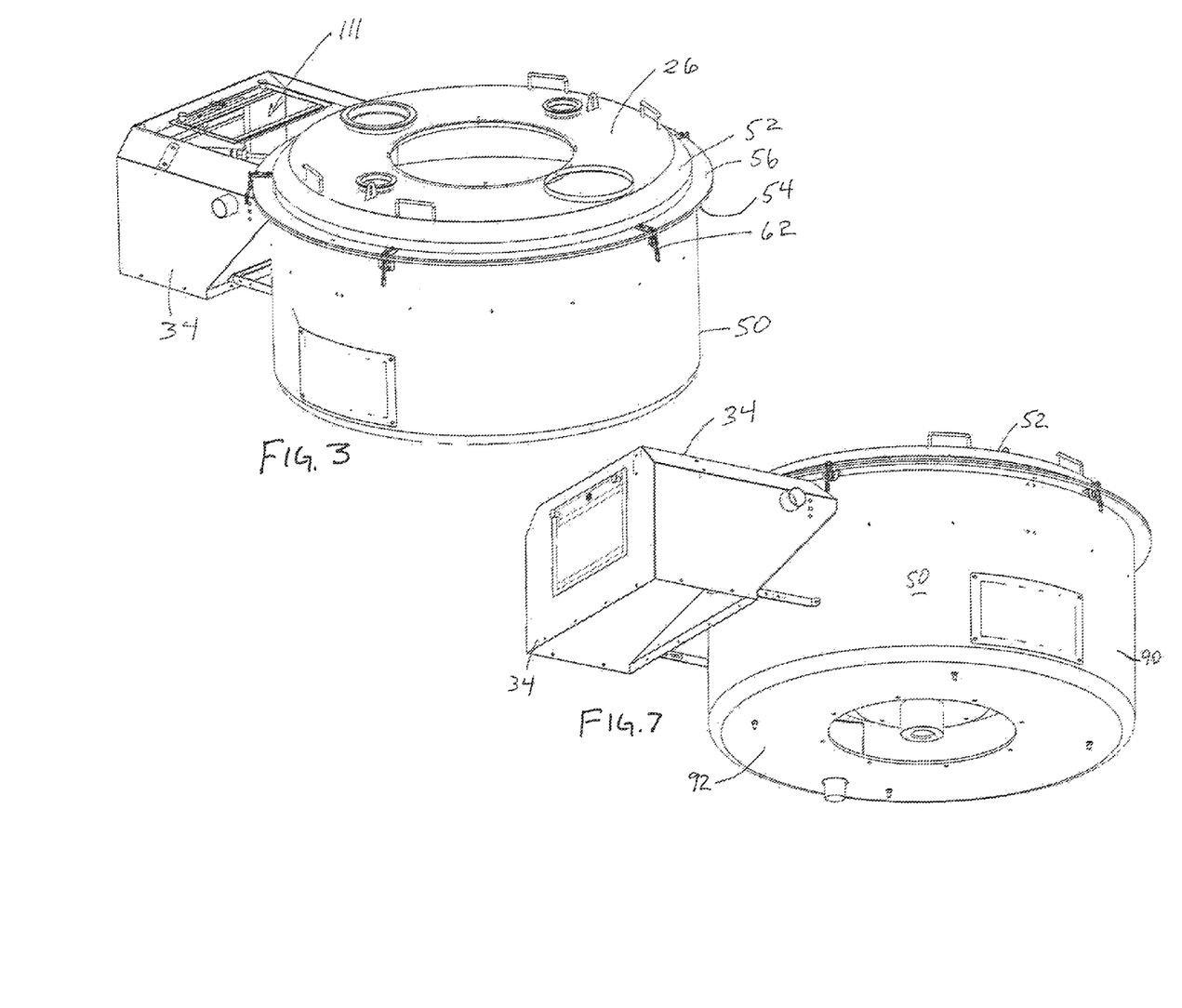
FIG. 3 is a perspective view of containment for the rotatable bowl.
FIG. 7 is a perspective view of the apparatus of FIG. 3 illustrating a flange for the rotatable bowl.
Figure 4:
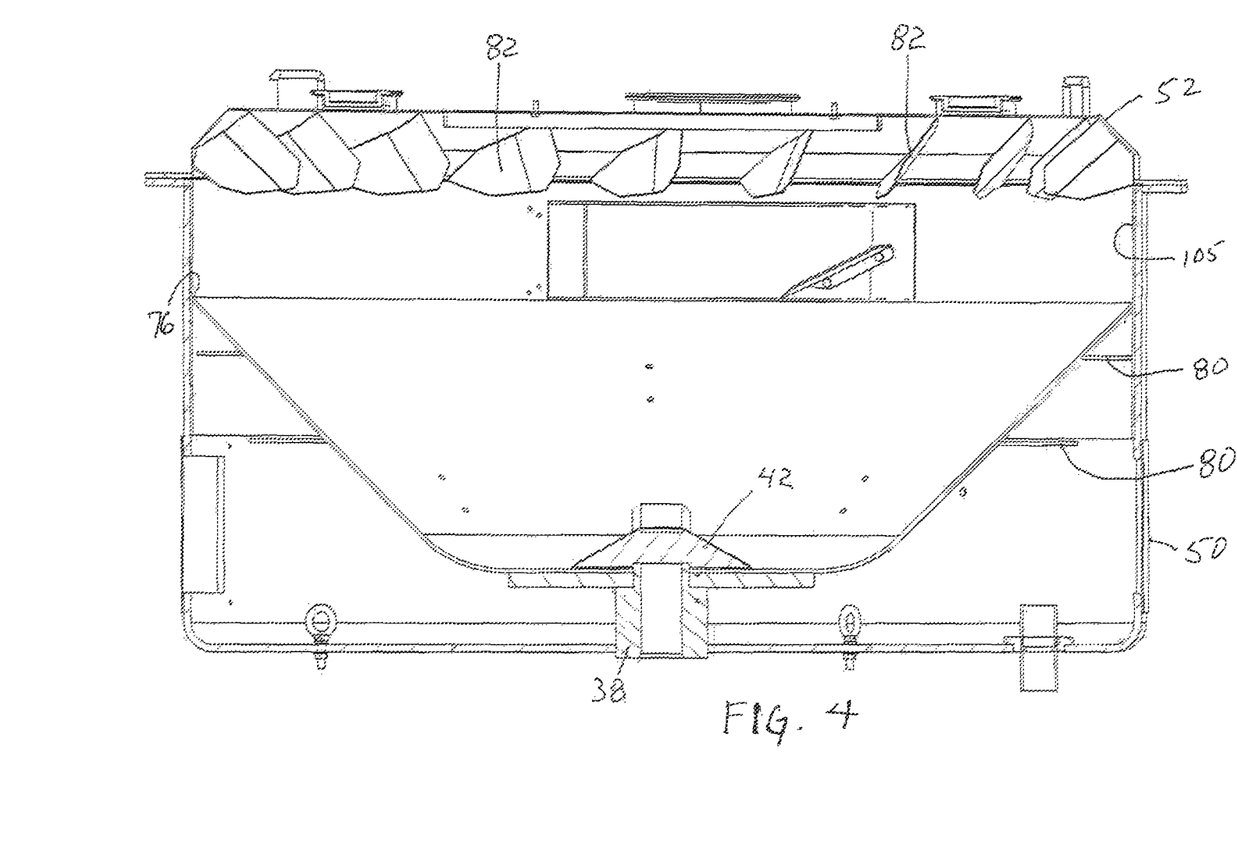
FIG. 4 is an elevational cross sectional view of the containment and rotatable bowl of FIG. 3 showing bowl hub assembly.
Figure 8:
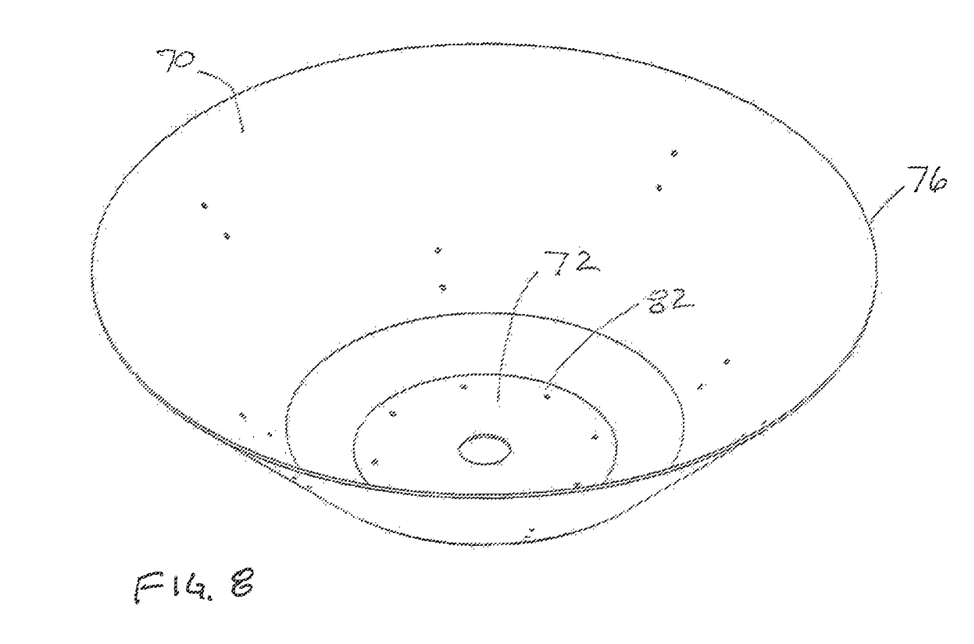
FIG. 8 is a perspective view of a bowl.
Figure 9:
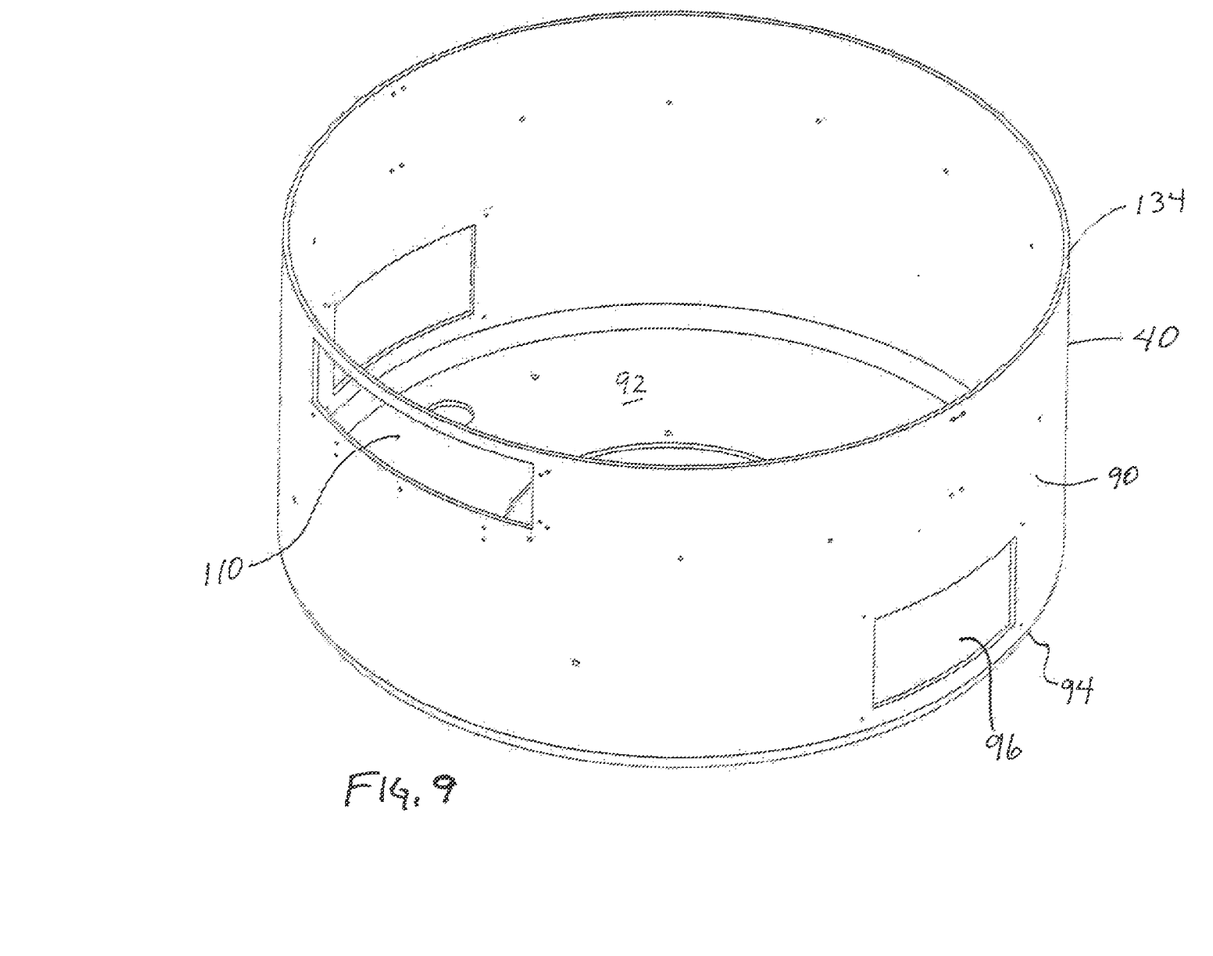
FIG. 9 is a perspective view of the containment showing the cylindrical side wall potion, the bottom wall portion, and the corner wall portion.
Figure 10:
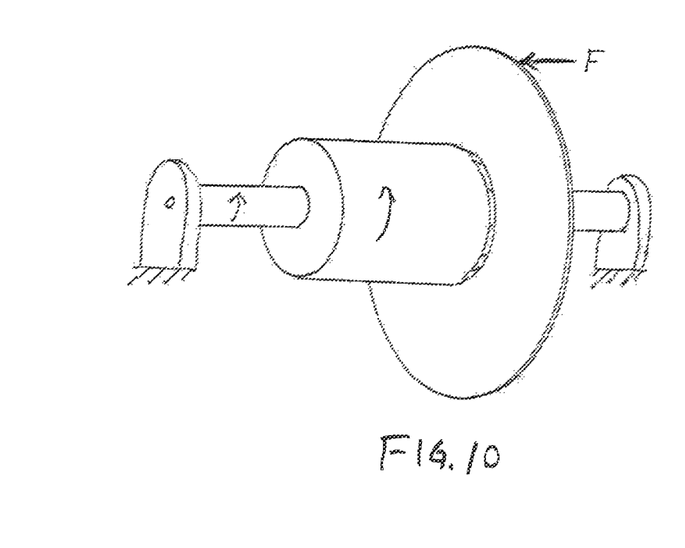
FIG. 10 is an illustration showing a method of manufacturing the rotatable bowl containment according to the invention herein.

The corner wall portion 94 is illustrated in detail in FIGS. 5 and 6. In embodiments the corner wall portion may be formed by the metal forming technique known as spinning. A planar plate, as illustrated in FIG. 10, is deformed into the shape best seen in FIGS. 2A, 2B, 4 and 9. A prior art corner wall portion 120 is illustrated in FIG. 11 and comprises the cylindrical wall portion 124 attached to the bottom wall portion 126 with a weld bead 130 at the juncture of the two pieces. The prior art method of construction was alignment, clamping and welding the pieces. The cylindrical wall portion would be formed from a plurality of pieces. Formation by spinning utilizing a single piece for the bottom wall portion, cylindrical wall portion and a corner wall portion provides a structure where the bottom wall portion and cylindrical wall portion are unitary, and where the bottom wall portion and cylindrical wall portion are not joined by welding. Spinning provides a seamless corner and with an advantageous radius of curvature. To the extent the entire containment base is formed by spinning other seams may be eliminated. For example, the seams formed from welding two or more cylindrical wall portion pieces is eliminated. After spinning a planar plate into the desired shape with the cylindrical wall positions, planar bottom portion and corner portions, the preform may be trimmed to the desired height of the containment base providing the top edge 134, as shown in FIG. 9, and then the containment base flange 54 is welded thereon. Openings may be cut therein by laser cutting or other conventional means.

In other embodiments, the cover 52 may also be similarly formed by spinning providing similar advantages to the container base. The cover may have a cylindrical wall portion 140, a planar top portion, 142, and a corner portion 144. The corner portion of FIG. 5 may represent the corner portion 144 of a cover formed by spinning. The cover flange 56 may be welded on after spinning a trimming the cover to size.

FIG. 5 illustrates a radius of curvature 150 of the lower inside corner that in embodiments is one half an inch or greater. In embodiments, it is 1 inch or greater. In other embodiments 1.5 inches or greater. In other embodiments, 2 inches or greater. In other embodiments, the radius of curvature is greater than ¾ of inch. In embodiments, the radius of curvature is at least 2.5 times the thickness of the metal from which the upright wall cylindrical wall was formed; in embodiments, at least 3.0 times the thickness. The curvature, specifically the lack of a sharp inside corner reduces the accumulation of seed or other debris and chemical remnants at such corner. This shape facilitates easy and more effective removal by brushing, air blowing, wiping or the like as compared to the conventional corner wall portion of FIG. 11.

FIG. 6 illustrates another embodiment that also facilitates easier cleaning than the prior art configuration of FIG. 11. A corner wall portion 160 has two internal obtuse angles 164, 166. A bottom wall portion 170 connects to a conical portion 172 at a juncture 173 and the conical portion then connects to a cylindrical wall portion 176 at juncture 177. Similar to the embodiment of FIG. 5, this embodiment facilitates easy and more effective removal by brushing, air blowing, wiping or the like as compared to the conventional corner wall portion of FIG. 11. The separate portions may be welded together or the conical portion may be formed by spinning a planar disk and then be attached to the cylindrical wall portion or portions by welding at the juncture 177. The containment and bowl are formed of steel.

U.S. Pat. Nos. 6,582,516; 5,589,246; and Publication No. US 20130273236; owned by the owner of the current application, disclose aspects of seed treaters, particularly batch seed treaters, that utilize mechanisms and systems application to the invention herein, for example drive systems, seed feed systems and components, chemical feed system and components. The documents are incorporated by reference herein for all purposes.

When used herein "seamless" means no welded joints and no separate pieces joined with fasteners. "Cylindrical" when used herein does not require a prefect geometric cylinder, and can have some "draft" for example, for removal from a spinning form.

I claim:

1. A seed treater comprising:
rotatable bowl having a vertical axis of rotation and an upper outer peripheral edge;
a containment comprising a containment base with an open top and a cover for covering the open top, the rotatable bowl enclosed in and rotatable with respect to the containment defining a gap between the upper outer peripheral edge and the containment;
a drive system for rotatable the rotatable bowl;
a central rotatable liquid chemical dispersion member;
a drive system for the rotatable liquid chemical dispersion member;
a seed inlet port connecting to the containment above the rotatable bowl; and
a seed outlet port connecting to the containment above the rotatable bowl;
wherein the a containment portion having a cylindrical metal wall portion, a metal corner wall portion, and a planar metal bottom wall portion, the corner wall portion unitary with each of and connecting the cylindrical metal wall portion and the planar bottom wall portion, the corner wall portion having an inside radius of at least ¾ of an inch; and the cylindrical wall portion, corner wall portion, and planar bottom wall portion, all formed of steel and being unitary and seamless with respect to one another.

2. The seed treater of claim 1 further comprising a polymer liner attached to the cylindrical wall and extending around and spaced from the bowl.

3. The seed treater of claim 2 wherein the polymer liner is secured with threaded fasteners to the cylindrical metal wall portion whereby the liner is replaceable by unfastening the threaded fasteners.

4. The seed treater of claim 1, wherein the cylindrical metal wall portion has an opening and the seed outlet port comprising an openable door closing said opening and further comprises a duct extending from the containment at the opening.

5. The seed treater of claim 1, wherein the gap extends around a circumference of the rotatable bowl and for the entire circumference the gap is less than 0.125 inches.

6. The seed treater of claim 1, wherein the gap extends around a circumference of the rotatable bowl and for the entire circumference the gap is less than 0.050 inches.

7. The seed treater of claim 1, wherein the gap extends around a circumference of the rotatable bowl and for the entire circumference the gap is less than 0.030 inches.

8. A batch seed treater comprising a containment enclosing a rotatable bowl and a spinnable liquid spray member, the containment comprising:
   a containment base and a cover, the containment base having a bottom wall portion, a cylindrical wall portion, and a corner wall portion joining the bottom wall portion to the cylindrical wall portion, the corner wall portion having at least two inside obtuse angles.

9. The batch seed treater of claim 8 wherein each obtuse angle is at least 110 degrees.

10. The batch seed treater of claim 8 wherein the cylindrical wall portion has at least one access port.

11. The batch seed treater of claim 8 wherein the corner wall portion has a radius of curvature greater than one half an inch.

12. A batch seed treater comprising a containment base with a rotatable bowl and chemical dispenser positioned therein, and further comprising a cover fittable at a top edge of the containment base to contain the rotatable bowl and chemical dispenser, the containment base having a liner attached to a cylindrical wall portion of the containment base and extending from the top edge of the containment base to below a uppermost edge of the rotatable bowl.

13. The batch seed treater of claim 12 wherein the liner is formed of stainless steel and is 1/16 to 3/16 inches thick.

14. The batch seed treater of claim 12 wherein the cover has a cylindrical wall portion with a radius which is less than the radius of the cylindrical wall portion of the container base at the top edge of the container base for providing a substantially flush alignment between an inwardly facing surface of the liner and the inwardly facing surface of the cylindrical wall portion of the cover.

* * * * *